(12) United States Patent
Hsu et al.

(10) Patent No.: US 8,349,257 B2
(45) Date of Patent: Jan. 8, 2013

(54) DETECTING APPARATUS WITH PHOTONIC CRYSTAL STRUCTURE

(75) Inventors: Shu-Kang Hsu, Hsinchu (TW); Sue-min Chang, Taitung (TW); Tzu-yin Chen, Chaozhou Township, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 23 days.

(21) Appl. No.: 12/858,995

(22) Filed: Aug. 18, 2010

(65) Prior Publication Data

US 2011/0262306 A1 Oct. 27, 2011

(30) Foreign Application Priority Data

Apr. 23, 2010 (TW) ............................... 99112940 A

(51) Int. Cl.
G01N 15/06 (2006.01)
G01N 33/00 (2006.01)
G01N 33/48 (2006.01)

(52) U.S. Cl. .............. 422/68.1; 422/50; 422/83; 436/43

(58) Field of Classification Search .................. 422/50, 422/68.1, 83, 82.01, 82.02; 436/43, 149, 436/164, 172

See application file for complete search history.

(56) References Cited

U.S. PATENT DOCUMENTS

| | | | |
|---|---|---|---|
| 7,228,016 B2 | 6/2007 | Beausoleil | |
| 7,250,591 B2 | 7/2007 | Mouli | |
| 7,289,221 B2 | 10/2007 | Wang et al. | |
| 7,307,732 B2 | 12/2007 | Beausoleil | |
| 7,318,903 B2 | 1/2008 | Link et al. | |
| 7,335,962 B2 | 2/2008 | Mouli | |
| 7,391,945 B2 | 6/2008 | Sugita | |
| 7,408,237 B2 | 8/2008 | Mouli | |
| 7,427,798 B2 | 9/2008 | Mouli | |
| 7,439,479 B2 | 10/2008 | Mouli | |
| 7,450,789 B2 | 11/2008 | Hosomi et al. | |
| 7,466,410 B2 | 12/2008 | Sigalas et al. | |
| 7,466,424 B2 | 12/2008 | Nathan et al. | |
| 7,492,979 B2 | 2/2009 | Wang et al. | |
| 7,499,606 B2 | 3/2009 | Xu et al. | |
| 2007/0152370 A1* | 7/2007 | Roberts et al. | ................ 264/255 |
| 2008/0129316 A1 | 6/2008 | Zoughi et al. | |
| 2010/0197516 A1* | 8/2010 | Holmes | ............................ 506/9 |

OTHER PUBLICATIONS

K. Lee et al. ("Protein-imprinted polysiloxane scaffolds," Acta Biomater. Jul. 2007; 3(4): 515-522).*
Yu, C., et al.; "Molecular Imprinting Utilizing an Amide Functional Group for Hydrogen Bonding Leading to Highly Efficient Polymers;" Journal of Organic Chemistry; 1997; pp. 4057-4064.
Pichon, V., et al.; "Role of Molecularly Imprinted Polymers for Selective Determination of Environments Pollutants—A Review;" 2008; pp. 48-61.

(Continued)

*Primary Examiner* — Brian J Sines
(74) *Attorney, Agent, or Firm* — McClure, Qualey & Rodack, LLP

(57) ABSTRACT

A detecting apparatus with photonic crystal structure comprises several empty spaces arranged orderly and a molecularly imprinted polymer containing an inorganic material. The molecularly imprinted polymer has several imprinted sites for specifically binding with a target compound. The empty spaces are orderly arranged in the inner of the molecularly imprinted polymer. The empty spaces and the molecularly imprinted polymer form a photonic crystal structure.

7 Claims, 3 Drawing Sheets

OTHER PUBLICATIONS

Whitcombe, M.J., et al.; "A New Method for the Introduction of Recognition Site Functionality into Polymers Prepared by Molecular Imprinting: Synthesis and Characterization of Polymeric Receptors for Cholesterol;" 1995; pp. 7105-7111.

Jiang, X., et al.; "A Novel Sol-Gel-Material Prepared by a Surface Imprinting Technique for the Selective Solid-Phase Extraction of Bisphenol A;" 2007; pp. 119-125.

Navarro-Villoslada, F., et al.; "Application of Multivariate Analysis to the Screening of Molecularly Imprinted Polymers for Bisphenol A;" 2004; pp. 149-162.

Takeda, K., et al.; "Bisphenol A Imprinted Polymer Adsorbents with Selective Recognition and Binding Characteristics;" Science and Technology of Advanced Materials 6; 2006; pp. 165-171.

Fujiwara, M., et al.; Bisphenol A Imprinted SiO-ZrO2 Mixed Oxide Materials Prepared by Acetic Anhydride Sol-Gel Method; Synthesis and Reactivity in Inorganic, Metal-Organic, and Nano-Metal Chemistry; 2007; pp. 771-777.

Ikegami, T., et al.; "Bisphenol A—Recognition Polymers Prepared by Covalent Molecular Imprinting;" 2004' pp. 131-135.

Endo, T., et al.; "Colorimetric Detection of Volatile Organic Compounds Using a Colloidal Crystal-Based Chemical Sensor for Environmental Applications;" 2007; pp. 589-595.

Hu, X., et al.; "Construction of Self-Reporting Specific Chemical Sensors with High Sensitivity;" 2007; pp. 4327-4332.

Wu, Z., et al.; "Direct and Label-Free Detection of Cholic Acid Based on Molecularly Imprinted Photonic Hydrogels;" Journal of Materials Chemistry; 2008; pp. 5452-5458.

Jiang, M., et al.; "Direct Enrichment and High Performance Liquid Chromatography Analysis of Ultra-Trace Bisphenol A in Water Samples with Narrowly Dispersible Bisphenol A Imprinted Polymeric Microspheres Column;" Journal of Chromatography A; 2006; pp. 27-34.

Ben-Moshe, M, et al.; Fast Responsive Crystalline Colloidal Array Photonic Crystal Glucose Sensors; 2006; pp. 5149-5157.

Wu, Z., et al.; "Label-Free Colorimetric Detection of Trace Atrazine in Aqueous Solution by Using Molecularly Imprinted Photonic Polymers;" 2008; pp. 11358-11368.

Watabe, Y., et al.; "LC/MS Determination of Bisphenol A in River Water Using a Surface-Modified Molecularly-Imprinted Polymer as an On-Line Pretreatment Device;" 2005; pp. 1193-1198.

Lee, K., et al.; "Photonic Crystal Chemical Sensors: pH and Ionic Strength;" 2000; pp. 9534-9537.

Reese, C.E., et al.; "Photonic Crystal Optrode Sensor for Detection of Pb2+ in High Ionic Strength Environments;" 2003; pp. 3915-3918.

Zhang, J.H., et al.; "Selective Solid-Phase Extraction of Bisphenol A Using Molecularly Imprinted Polymers and its Application to Biological and Environmental Samples;" 2006; pp. 780-786.

Ikegami, T., et al.; "Synthetic Polymers Adsorbing Bisphenol A and its Analogues Prepared by Covalent Molecular Imprinting Using Bisphenol A Dimethacrylate as a Template Molecule;" 2004; pp. 1898-1902.

* cited by examiner

DETECTING APPARATUS WITH PHOTONIC CRYSTAL STRUCTURE

This application claims the benefit of Taiwan application Serial No. 99112940, filed Apr. 23, 2010, the subject matter of which is incorporated herein by reference.

BACKGROUND

1. Technical Field

The disclosure relates in general to a detecting apparatus with a photonic crystal structure, and more particularly to a detecting apparatus with a photonic crystal having molecularly imprinted sites used for quickly detecting a concentration of one of various kinds of target compounds.

2. Description of the Related Art

Recently, scientists have found some chemical substances would interfere with endocrine system, and thus have called them as endocrine disrupters (EDs) or endocrine disrupting chemicals (EDCs). Since the environmental hormone (or EDC) would generate artificial synthetic chemical substances disrupting endocrine of biological bodies, seriously affecting developments, growths, acts or procreations of biological bodies, and the environmental hormone has continually recycled in the environment, UNEP has made the environmental hormone a significant issue. In addition, the Environmental Protection Agency of the country has investigated common plasticizers of Bisphenol A, nonyl phenol, etc, and has found that environmental distribution conditions of which are very serious.

Investigation data of the Environmental Protection Agency shows that headwater taken by water treatment plants in the country has environmental hormones of several ppbs. If the concentration of environmental hormone in water is monitored by a current environmental hormone analyzing equipment—a super-sensitive liquid chromatography-mass spectrophotometer (LC/MS) (such as a serial type LC/MS, biosensor, etc, it needs a time (including a time for a pretreatment) of several hours up to several days to obtain a result, far more than a time of 2-3 hours for a water purification process of the water treatment plant. Therefore, the water treatment plant could not monitor the headwater and identify the quality of the purified water immediately. Thus, a detecting apparatus for detecting environmental hormones in water easily and quickly for immediately confirming the concentration of the environmental hormone in the headwater and purified water for the water treatment plant is needed.

Besides the environmental hormones, other environmental pollutants or biochemical substances such as protein molecules, antibodies, etc. are all need to be detected by methods that are precise, quick and cheap. Detecting a target compound by using a conventional super-sensitive analysis instrument has disadvantages of complicated process, long analysis time, high cost, etc. For example, the instrument of the super-sensitive LC/MS is very expensive. When using the super-sensitive LC/MS, a test sample needs a pretreatment. The analyzing process is complicated. In addition, the quality specification has a high standard. Thus, using the super-sensitive LC/MS has a high threshold and incurs expensive cost. Moreover, the super-sensitive LC/MS has high analysis accuracy and can analyze many kinds of substances. However, the analysis time (including a time for pretreatment) cost at least ten hours. Thus, it is hard to investigate a distribution of the target compound instantaneously. Moreover, for example, biosensors also can be used for detecting environmental hormones. In addition, since the obtained result relates to total content representations, a composition of a single environmental hormone could not be distinguished. Thus, it is hard to trace a generating source and make prevention. Moreover, preserving biological molecules is not easy. Therefore, the lifetime is short, and the stability during the usage is limited. In addition, the analysis time (including a time for pretreatment) cost several ten hours. Thus, it is not a proper method for instantaneously monitoring environmental hormones.

Accordingly, it is need to develop a detecting apparatus for detecting each of target compounds with a low cost, simple analyzing process, and on-the-scene instantaneity for improving the detecting technique of chemical analyzing. For example, developing a detecting apparatus for environmental hormones would help the environmental protection organization to know well and control distributions of environmental hormones.

SUMMARY

The disclosure is directed to a detecting apparatus with a photonic crystal structure, constructed by combining techniques of the photonic crystal structure and a molecular imprinted material, etc, for on the scene and quickly detecting and analyzing a concentration of a target compound, such as an environmental hormone, protein molecule, antibody, etc.

According to the present disclosure, a detecting apparatus with a photonic crystal structure is provided. The detecting apparatus comprises a molecularly imprinted polymer containing an inorganic material. The molecularly imprinted polymer has a plurality of molecularly imprinted sites for binding with a target compound. A plurality of empty spaces are arranged orderly in an inner of the molecularly imprinted polymer. The molecularly imprinted polymer and the empty spaces form a photonic crystal structure.

The above and other aspects of the disclosure will become better understood with regard to the following detailed description of the non-limiting embodiment(s). The following description is made with reference to the accompanying drawings.

DETAILED DESCRIPTION

The present disclosure provides a detecting apparatus with a photonic crystal structure. Molecularly imprinted sites are used for greatly and specifically binding with a target compound. The accuracy of the analysis result is enhanced since interferences from other substances are avoided. The photonic crystal structure is used as a signal transduction element. As a molecularly imprinted material binds with the target compound, an optical property of the photonic crystal structure changes. For example, the reflection peak would shift. Therefore, measuring the change of the optical property and matching the change to a corresponding relation between the signal and the concentration can quickly obtain the concentration of the target compound in a test sample.

The present disclosure provides an embodiment with several related experiments for details. However, while the disclosure is described by way of embodiment and in terms of the exemplary experiments, that include a detecting apparatus structure, a target compound, a manufacturing process of a detecting apparatus, etc., it is to be understood that the disclosure is not limited thereto. One skilled in the art could somewhat vary the detecting apparatus according to the embodiment and the experiment in the disclosure to fit needs for actual conditions. In addition, figures for the embodiment only show relating elements of the technique of the present disclosure and omit non-essential elements, for clearly illustrating technique features of the present disclosure. Moreover, the experiment is illustrated with Bisphenol A as the target compound.

<Detecting Apparatus Structure>

Figure 1:
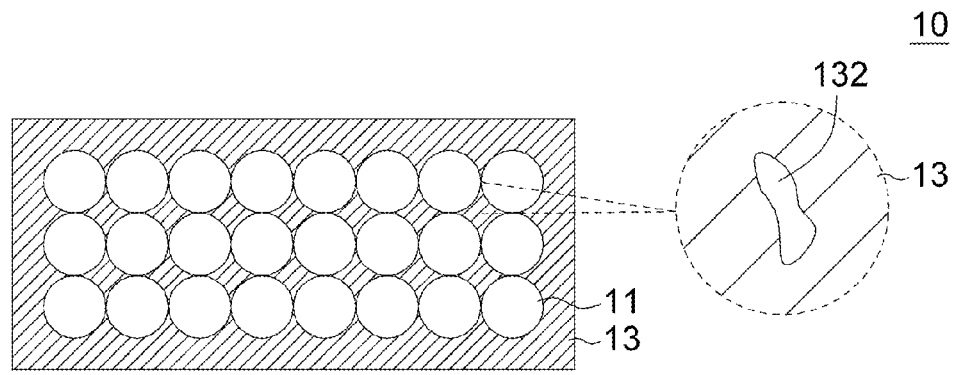
FIG. 1 is a schematic diagram of a detecting apparatus with a photonic crystal structure according to one embodiment of the present disclosure.

FIG. 1 is a schematic diagram of the detecting apparatus with the photonic crystal structure according to one embodiment of the present disclosure. The detecting apparatus 10 includes a plurality of empty spaces 11 and a molecularly imprinted polymer 13 containing an inorganic material. The molecularly imprinted polymer 13 has a plurality of molecularly imprinted sites 132. A shape of the molecularly imprinted site 132 corresponds to a shape of the target compound for binding with the target compound. The empty space 11 are arranged orderly in the inner of the molecularly imprinted polymer 13. The molecularly imprinted polymer 13 and the empty spaces 11 form a photonic crystal structure. During a testing process, after the molecularly imprinted site 132 binds with the target compound, the optical property of the photonic crystal structure changes. For example, the reflection peak would shift. Therefore, measuring the change of the optical property and matching the change to a corresponding relation between the signal and the known concentration, such as a pre-established calibration line, can quickly obtain the concentration of the target compound in a test sample.

In one embodiment, the empty spaces 11 have substantially spherical or particle shapes of the same size. However, the present disclosure is not limited thereto. In addition, in one embodiment, the molecularly imprinted polymer 13 containing the inorganic material includes one or more inorganic materials, such as siloxane compound, or silicon, zirconium, titanium, aluminum, zinc, etc. In other embodiments, the molecularly imprinted polymer may comprise one or more inorganic-organic crosslinked materials. The inorganic-organic crosslinked material is, for example, selected from a group consisting of titanium tetrabutoxide, tetrabutyl titanate, titanium isopropoxide and zirconium tetrapropanolate. In other embodiments, alternatively, the inorganic-organic crosslinked material may comprise a main inorganic material dopped with little organic monomer for improving the test effect. The organic monomer may be, for example, a monomer mainly including a siloxane precursor, such as n-hexyltriethoxysilane, triethoxypropylsilane, propyltriethoxysilane, triethoxyoctylsilane (n-octyltriethoxysilane), octadecyltriethoxysilane (triethoxyoctadecylsilane), and so on.

In addition, in practical applications, the detecting apparatus 10 may be used for detecting a liquid phase or vapor phase sample. If the test sample has a liquid phase, the empty spaces 11 are full of the liquid during the detecting process. If the test sample has a vapor phase, the empty spaces 11 are full of the vapor during the detecting process. The target compound (target contaminant) in the liquid phase and vapor phase same binds to the inner of the molecularly imprinted site 132. Moreover, the detecting apparatus 10 can be applied in a wide application field. For example, the detecting apparatus 10 may be applied for detecting environmental contaminants, such as 17-β estradiol, 6-Ketoestradiol, Benzo(a)pyrene, Caffeine, alfuzosin, Carbaryl, Cathecol, Terbutylphenol, Atrazine, etc. Alternatively, the detecting apparatus 10 may be applied for detecting bio-substances, such as Bovine Serum Albumin, cholic acid, etc. The detecting apparatus 10 may also be applied for detecting gases, such as toluene, xylene, ethyl benzene, etc. The detecting apparatus 10 also may be used for detecting other test molecular substances.

Figure 2:
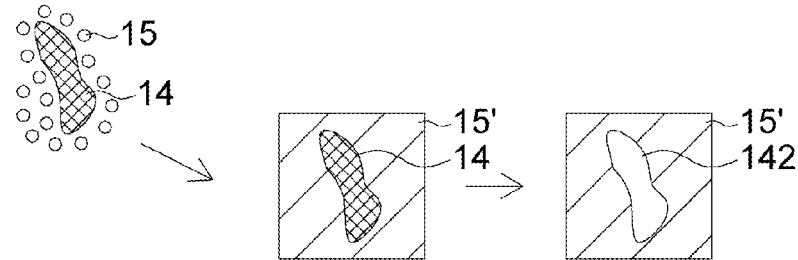
FIG. 2 is a diagram showing a fabrication method for the molecularly imprinted polymer as shown in FIG. 1.

FIG. 2 is a diagram showing a fabrication method for the molecularly imprinted polymer as shown in FIG. 1. In a molecular imprinting method, after the molecular template and the specific monomer for forming the polymer are themselves assembled by a covalent bonding (chemical bonding) or a non-covalent bonding (ion pair, hydrogen bonding, Van Der Waals' force), it can be used as a basis for molecular recognizing (refer to ANALYTICA CHIMICA ACTA 622 (2008) 48-61; J. Org. Chem. 1997, 62, 4057-4064; J. Am. Chem. Soc. 1995, 117, 7105-7111). As shown in FIG. 2, in one embodiment, the molecular template 14 to be imprinted (i.e. the target compound to be detected) and the specific monomer for forming a polymer 15 are provided. Since the molecularly imprinted polymer 13 including the inorganic material mainly uses an inorganic material, a network structure of the molecular template 14 and the polymer 15' may be formed by a sol-gel method. Then, the molecular template 14 is removed. Therefore, the molecularly imprinted polymer is formed. The generated molecularly imprinted sites 142 may later bind with the target compound.

Figure 3:
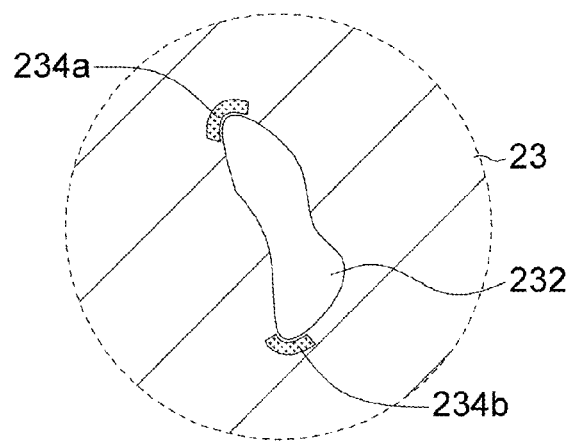
FIG. 3 is a partially enlarged schematic diagram of a molecularly imprinted polymer containing an inorganic material of a detecting apparatus according to one another embodiment of the present disclosure.

FIG. 3 is a partially enlarged schematic diagram of the molecularly imprinted polymer of the detecting apparatus according to another embodiment of the present disclosure. In other embodiments, the molecularly imprinted polymer containing the inorganic material further comprises at least one specific functional group. The molecularly imprinted polymer 23 further comprises one or more specific functional groups 234a, 234b in the molecularly imprinted sites 232. The specific functional groups 234a, 234b may bind with the target compound to assist the molecularly imprinted sites 232 to capture the corresponding target compound. In embodiments, the specific functional group, for example, includes a phenyl group, amino group or hydroxyl group, etc. The number of the specific functional group in one molecularly imprinted site 232 is not limited. The specific functional groups 234a, 234b may be the same or different. The specific functional groups 234a, 234b may be selected or designed according to actual demands (such as types and characteristics of the target compound). For example, for enhancing the ability for recognizing and adsorbing Estradiol E2 (17β-estradiol), an amino ($NH_2$) group (the molecular force of which is the hydrogen bonding), hydroxyl (OH) group (the molecular force of which is the hydrogen bonding) or phenyl group (the molecular force of which is π-π interaction force), etc., may be designed to be used as the specific functional group in the molecularly imprinted site 232.

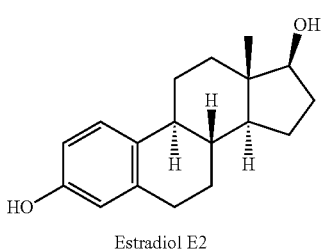

Estradiol E2

Figure 4:
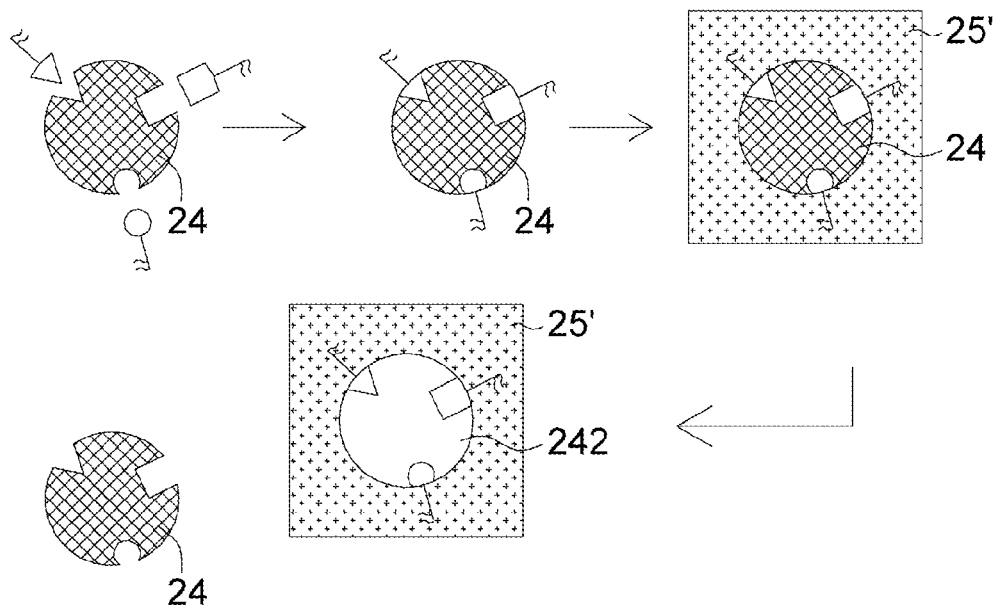
FIG. 4 is a diagram showing a method for forming the molecularly imprinted polymer shown in FIG. 3.

FIG. 4 is a diagram showing a method for forming the molecularly imprinted polymer shown in FIG. 3. As shown in FIG. 4, the molecular template 24 of the target compound and the specific monomer are themselves assembled. In FIG. 4, a molecular template 24 capable of binding with three different functional groups is used for illustration. Next, the specific monomer for forming the polymer is added. After a polymerization (such as a crosslinking polymerization) reaction of the specific monomer is performed, the molecular template 24 with the specific functional groups and the polymer 25' of the network structure is formed. Next, the molecular template 24 is removed. Thus, the molecularly imprinted polymer having the specific functional groups is formed. The generated molecularly imprinted sites 242 may later bind with the target compound.

In one embodiment, if Bisphenol A is the target compound, the shapes of the molecularly imprinted sites are corresponded to the shape of Bisphenol A. The molecularly imprinted sites may comprise one or more phenyl groups (as the specific functional group) for binding with Bisphenol A for assist the molecularly imprinted sites to capture Bisphenol A of the target compound. As described above, the polymer 25' (i.e. the molecularly imprinted polymer including the inorganic material) may comprise one or more inorganic materials, such as a siloxane compound, or a precursor of an inorganic material of silicon, zirconium, or titanium, aluminum, zinc, etc. The polymer 25' may also be an inorganic-organic crosslinked material formed with a main inorganic material dopped with little organic monomer. In embodiments, therefore, the inorganic material modified with the organic function group (phenyl group) is used as the molecularly imprinted polymer material.

Figure 5:
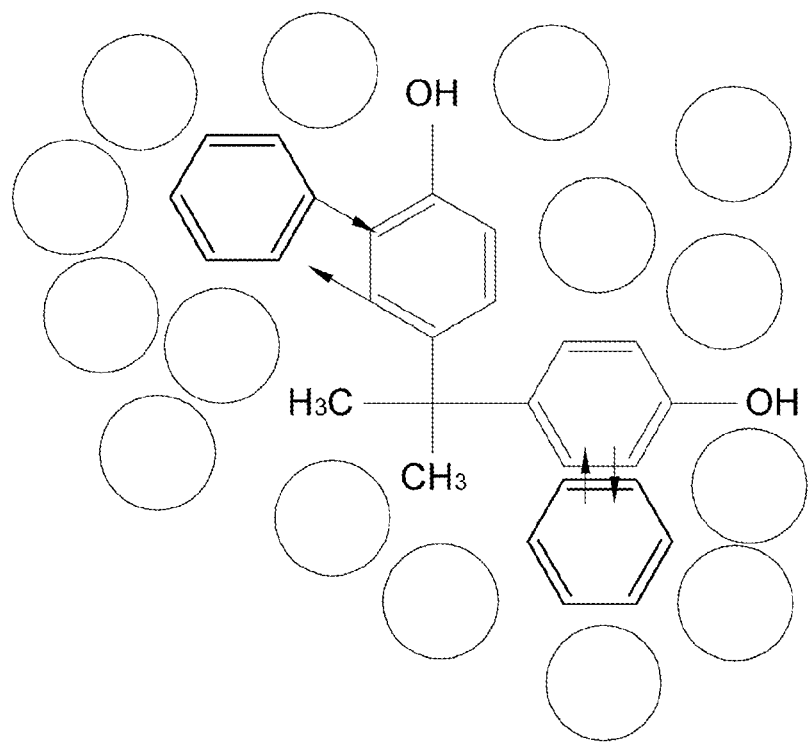
FIG. 5 is a schematic diagram showing that a phenyl group is used as a specific functional group for assisting a molecularly imprinted site to capture Bisphenol A.

The phenyl group of the specific functional group and the phenyl group of Bisphenol A are binding together by π-π stacking interaction (in which the π bond of the double bond would overlap with another π bond). FIG. 5 is a schematic diagram showing that the phenyl group is used as the specific functional group for assisting the molecularly imprinted site to capture the Bisphenol A.

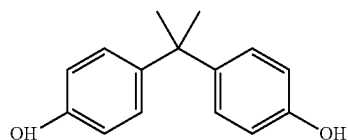

chemical formula of Bisphenol A

Figure 6:
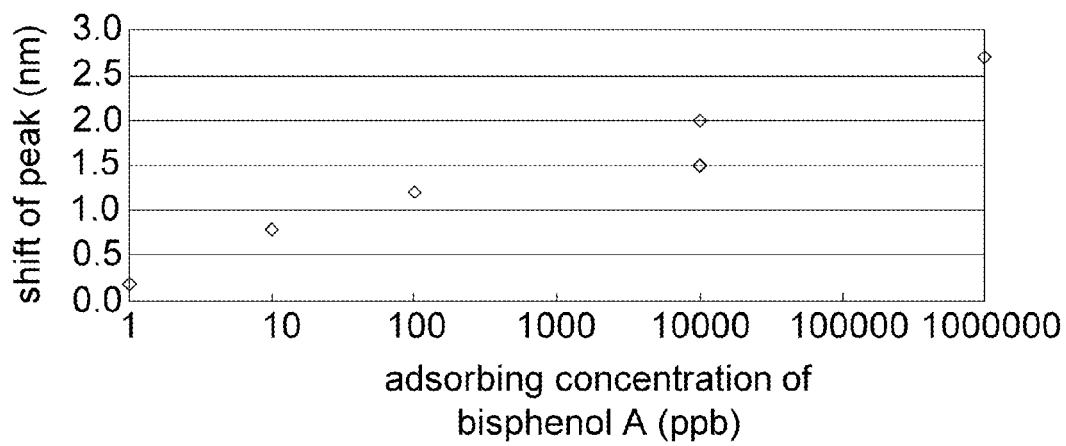
FIG. 6 is a schematic diagram having a calibration line obtained by recording shifts of peaks and concentrations of Bisphenol A.

As the molecularly imprinted material of the photonic crystal, which comprises empty spaces 11 arranged orderly and the molecularly imprinted polymer 13 containing the inorganic material at the outsides of and between the empty spaces 11 as shown in FIG. 1 and used as a signal transduction element herein, binds with the Bisphenol A, a peak of this photonic crystal would shift. As the concentration of the Bisphenol A binding to the molecularly imprinted material changes, the shift of the peak changes. A calibration line, as shown in FIG. 6, can be obtained by measuring the shift of the peak and the corresponding concentration of the Bisphenol A. After the photonic crystal binds with a test sample, a concentration of the Bisphenol A in the test sample can be quickly obtained by measuring the shift of the peak (signal) of the photonic crystal and then check the shift with the calibration line.

The following describes in detail an embodiment for fabricating a detecting apparatus for detecting a target compound of Bisphenol A.

<Fabricating Detecting Apparatus with Photonic Crystal of Bisphenol A>

Figure 7:
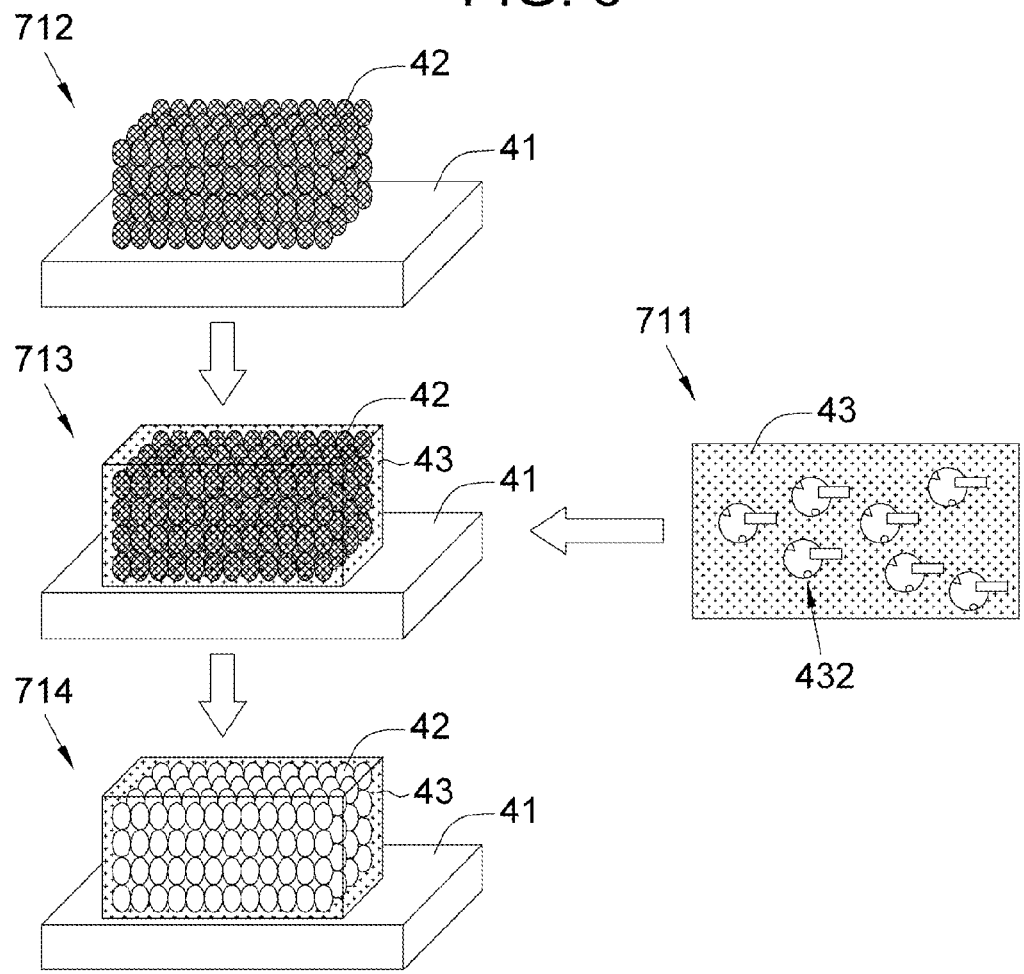
FIG. 7 is a schematic diagram of fabricating the detecting apparatus of one experiment of the present disclosure.

In one experiment, a high-orderly arranged structure of styrene micrometer spheres of a uniform size is constructed by a molecular self-assembling method. A material recognizing Bisphenol A, such as the molecularly imprinted polymer containing the inorganic material 13 shown in FIG. 1, is formed by a sol-gel method, in which Bisphenol A is acted as the molecular template. Next, the molecularly imprinted polymer is permeated into the voids between the orderly arranged styrene micrometer spheres. Next, the styrene micrometer spheres and the Bisphenol A molecular template are removed. FIG. 7 is a schematic diagram of fabricating the detecting apparatus of one experiment of the present disclosure. Referring to FIG. 7, the detailed process of the experiment is described below.

1. Synthesizing Molecularly Imprinted Polymer

Fabrication of molecularly imprinted polymer material for binding with Bisphenol A is disclosed.

2.3 g of Bisphenol A of 97 wt % was mixed with 40 ml anhydrous alcohol to be dissolved for forming a mixture. Next, 2 ml of phenyl-trimethoxysilan (PhTMOS) of 94 wt %, 10 ml of tetraethoxysilane (TEOS) of 99.9 wt % and 1.6 ml of Trimethoxypropylsilane of 97 wt % were added and uniformly mixed in the mixture. Next, 4 ml of HCl of 0.1 M was added into the mixture, and the mixture had been stirred for 48 hours (step 711).

2. Arranging Photonic Crystal Template

Styrene micrometer spheres 42 of 3.3 wt % and a diameter of 240 nm were dropped on a slide glass 41. The styrene micrometer spheres 42 were heated to 40° C. until they self-assembly became a photonic crystal template of a high-orderly arranged structure (step 712).

3. Assembling Bisphenol A-Imprinted Adsorbing Material and Photonic Crystal Template A proper amount of the colloida Bisphenol A adsorbing material 43 fabricated above was injected into the voids of the photonic crystal template by capillary phenomenon so as to obtain a photonic crystal structure having the Bisphenol A-imprinted adsorbing material 43 and the styrene micrometer spheres 42 (step 713).

The Bisphenol A adsorbing material 43 in the photonic crystal template was solidified and stabilized by heating the photonic crystal structure at 105° C. over 8 hours in the backing oven.

Next, the dried Bisphenol A-imprinted adsorbing material 43 and styrene photonic crystal structure was immersed in 30ml of toluene for removing the styrene micrometer spheres 42 therein (step 712) and generating empty spaces 421 arranged orderly. Next, the slide glass 41 was taken out from the toluene. Therefore, a Bisphenol A-imprinted adsorbing agent of the photonic crystal structure (hereafter, Bisphenol A photonic crystal adsorbing agent) was obtained.

The Bisphenol A photonic crystal adsorbing agent was washed by 20 ml of a methyl alcohol solvent for at least four times for removing the Bisphenol A molecular template (generating molecularly imprinted sites 432 (step 714).

After the Bisphenol A photonic crystal adsorbing agent was washed by the toluene, it was washed by 40 ml of deionized water for over ten times. Next, the Bisphenol A photonic crystal adsorbing agent was immersed in a deionized water to being standby for use.

<Photonic Crystal Testing System Assemblage>

The following illustration describes a photonic crystal testing system assemblage of one experiment. However, one skilled in the art would understand the following illustration is merely used for statement, and the present disclosure is not limited thereto. Proper adjustments can be made to the system according to conditions in actual applications.

Table 1 shows specifications of main equipments of photonic crystal testing system of the experiment. Except the computer installing and operating the software, the other equipments of the testing system are all disposed in one acrylic box of 40 cm(L)×30 cm(W)×15 cm(H).

TABLE 1

Specifications of main equipments of photonic crystal testing system

| Name of article | Specifications | Unit |
| --- | --- | --- |
| Custom Configuration Fiber Optic Spectrometer | Plugs directly into Universal Serial Bus port of any desktop or notebook PC, Win98 & 2000, GRATING-II, Lines: 1800/mm, Wavelength Range: 350~500 nm; Longpass Filter, Transmits Light >305 nm | 1 PC |
| Miniature Tungsten Halogen Source | 3100 K, 120 V | 1 PC |
| Operating Software | Capable of collecting signal from spectrometer, output and archiving | 1 PC |
| Reflection/ Backscattering Probes | Fiber Code Dia: 200 um, Fiber Bundle: 6 illuminaiton fiber around 1 read fiber, Optimization: UV-vis for 300-1100 nm, NA: 0.22, Terminations: Premium-grade SMA 905, For 2 meters length Silica | 1 PC |

Steps for testing the concentration of the Bisphenol A in the water by using the Bisphenol A photonic crystal adsorbing agent are described as below.

1. First, the spectrometer is connected to the computer.
2. The soft ware is turned on and checked to be able to receive the signal from the spectrometer
3. The spectrometer is calibrated in items of, for example, darkness, and brightness according to vender's suggestions. Next, the soft ware is set for reading reflection signals.
4. The slide glass coated with the Bisphenol A photonic crystal adsorbing agent is disposed in the fused-quartz cell and fixed by the fixture.
5. As the fused-quartz cell is disposed in front of the reflection fiber probe and 40 ml of ultrapure water is poured in the fused-quartz cell, the spectral signal is recorded at the initial time and the ten minutes after the starting. If the signal of the total reflection peak does not shift, a testing for water sample can be performed.
6. After the ultrapure water is removed, and 40 ml of the water sample is put in the fused-quartz cell, the spectral signals at the initial time and the desired time for comparing are recorded.
7. The shift of the peak is analyzed by a trial table or calculating software. A calibration line can be pre-established by comparing the shift of the total reflection peak of the water sample Bisphenol A of the known concentration. In addition, the calibration line can be used as a comparing basis for results of testing a water sample having Bisphenol A of an unknown concentration.

In the detecting apparatus having the photonic crystal structure disclosed in the above embodiments of the present disclosure, molecularly imprinted sites are used for greatly specifically binding with a certain target compound. Thus, the accuracy of the analysis result is enhanced since interferences from other substances are avoided. In addition, the detecting apparatus using the photonic crystal structure can quickly obtain the concentration of the target compound in the test sample. The detecting apparatus of the present disclosure has a smaller system volume, more stable testing process, easier operating step, and cheaper equipment cost than a current environmental hormones analyzing equipment-a super-sensitive LC/MS (such as serial type LC/MS) and a biosensor. Analysis time of the detecting apparatus of the present disclosure is far less than that of the current analyzing apparatus. Therefore, the detecting apparatus of the present disclosure is suitable for instant monitoring various types of environmental substances such as environmental hormones. Moreover, the method described above can be used for developing an integrated chip for analyzing and investigating many kinds of environmental hormones desired to know at the same time. Moreover, the embodiment applied in instant monitoring environmental hormones is described as above, however, the present disclosure is not limited thereto. Besides detecting environmental hormone substances, the present disclosure can be applied in wide applications such as detecting biomedical specific molecules and other specific environmental pollutants.

Accordingly, the detecting apparatus of the present disclosure that can be used on the scene and quickly can be applied in wide applications such as monitoring a quality of a water supplied by a water supplier of a water treatment plant and so on; establishing an environmental distribution data of environmental hormones for an environmental protection organization; or being protective articles for personal health of personal drinking, healthy water, etc., and thus has a abundant value of application.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A detecting apparatus with a photonic crystal structure, comprising:
    a molecularly imprinted polymer comprising an inorganic material, wherein the molecularly imprinted polymer has a plurality of molecularly imprinted sites for binding with a target compound, the molecularly imprinted sites corresponding in shape to the target compound, and the inorganic material comprises siloxane compound; and
    a plurality of empty spaces of similar size and shape arranged orderly within the molecularly imprinted polymer such that the molecularly imprinted polymer comprising the inorganic material is located outside of and between the plurality of empty spaces;
    wherein the molecularly imprinted polymer and the empty spaces form the photonic crystal structure.

2. The detecting apparatus according to claim 1, wherein the molecularly imprinted polymer comprises one or more inorganic materials selected from a group consisting of silicon, zirconium, titanium, aluminum and zinc.

3. The detecting apparatus according to claim 1, wherein the molecularly imprinted polymer comprises one or more inorganic-organic crosslinked materials, wherein the inorganic-organic crosslinked material is selected from a group consisting of titanium tetrabutoxide, tetrabutyl titanate, titanium isopropoxide and zirconium tetrapropanolate.

4. The detecting apparatus according to claim 1, wherein the molecularly imprinted sites further comprises a specific functional group for binding with the target compound, and the specific functional group is selected from a group consisting of phenyl group, amino group and hydroxyl group.

5. The detecting apparatus according to claim 1, wherein a shape of the molecularly imprinted site corresponds to a shape of Bisphenol A.

6. The detecting apparatus according to claim 5, wherein the molecularly imprinted site further comprises one or more phenyl groups for bonding with the Bisphenol A.

7. The detecting apparatus according to claim 1, wherein the empty spaces have spherical shapes of the same size.

* * * * *